US011318859B2

(12) United States Patent
Henry et al.

(10) Patent No.: US 11,318,859 B2
(45) Date of Patent: May 3, 2022

(54) METHODS FOR RECONFIGURABLE POWER EXCHANGE FOR MULTIPLE UAV TYPES

(71) Applicant: Asylon, Inc., Wilmington, DE (US)

(72) Inventors: Damon C. Henry, Philadelphia, PA (US); Adam I. Mohamed, Philadelphia, PA (US); Brent McLaughlin, Savage, MD (US); David Dones, Thornton, PA (US)

(73) Assignee: Asylon, Inc., Philadelphia, PA (US)

( * ) Notice: Subject to any disclaimer, the term of this patent is extended or adjusted under 35 U.S.C. 154(b) by 63 days.

(21) Appl. No.: 15/943,581

(22) Filed: Apr. 2, 2018

(65) Prior Publication Data
US 2018/0222339 A1 Aug. 9, 2018

Related U.S. Application Data

(62) Division of application No. 15/285,820, filed on Oct. 5, 2016, now Pat. No. 9,969,285.
(Continued)

(51) Int. Cl.
*B60L 53/80* (2019.01)
*B64F 1/00* (2006.01)
*B64F 1/20* (2006.01)
*B60L 53/36* (2019.01)
*B60L 53/35* (2019.01)
*B64C 39/02* (2006.01)
(Continued)

(52) U.S. Cl.
CPC ............... *B60L 53/80* (2019.02); *B60L 53/35* (2019.02); *B60L 53/36* (2019.02); *B64C 39/024* (2013.01); *B64D 45/08* (2013.01); *B64F 1/007* (2013.01); *B64F 1/12* (2013.01); *B64F 1/20* (2013.01); *B64F 1/362* (2013.01); *G05D 1/0027* (2013.01); *G05D 1/0676* (2013.01); *B60L 2200/10* (2013.01); *B64C 2201/042* (2013.01); *B64C 2201/066* (2013.01); *B64C 2201/141* (2013.01); *B64C 2201/18* (2013.01); *Y02T 10/70* (2013.01); *Y02T 10/7072* (2013.01); *Y02T 90/12* (2013.01); *Y02T 90/14* (2013.01)

(58) Field of Classification Search
CPC ...... B60L 11/1822; B60L 53/35; B60L 53/36; B60L 53/80
See application file for complete search history.

(56) References Cited

U.S. PATENT DOCUMENTS 7,957,850 B2 6/2011 Anderson
8,511,606 B1 8/2013 Lutke et al.
(Continued)

FOREIGN PATENT DOCUMENTS

DE 10 2013 004 881 A1 9/2014
WO WO 2017/062418 4/2017

*Primary Examiner* — Michael D Lang
(74) *Attorney, Agent, or Firm* — Levine Bagade Han LLP (57) ABSTRACT

A reconfigurable system capable of autonomously exchanging material from unmanned vehicles of various types and sizes. The system comprises an environmental enclosure, a landing area, a universal mechanical system to load and unload material from the unmanned vehicle, and a central processor that manages the aforementioned tasks. The landing area may comprise a one or more visible or non-visible markers/emitters capable of generating composite images to assist in landing the unmanned vehicle upon the reconfigurable, autonomous system.

20 Claims, 11 Drawing Sheets

Related U.S. Application Data (60) Provisional application No. 62/265,703, filed on Dec. 10, 2015, provisional application No. 62/237,245, filed on Oct. 5, 2015.

(51) Int. Cl.
*B64D 45/08* (2006.01)
*B64F 1/12* (2006.01)
*B64F 1/36* (2017.01)
*G05D 1/06* (2006.01)
*G05D 1/00* (2006.01)

(56) References Cited

U.S. PATENT DOCUMENTS

| | | |
|---|---|---|
| 8,862,288 B2 | 10/2014 | Vavrina et al. |
| 8,899,903 B1 | 12/2014 | Saad et al. |
| 9,139,310 B1 * | 9/2015 | Wang ................ B64F 1/36 |
| 9,174,747 B2 | 11/2015 | Kang |
| 9,481,458 B2 | 11/2016 | Casado et al. |
| 9,764,836 B1 * | 9/2017 | Elzinga ............. B64C 39/024 |
| 9,783,075 B2 | 10/2017 | Henry et al. |
| 9,969,285 B2 | 5/2018 | Henry et al. |
| 2013/0104361 A1 | 5/2013 | Corfitsen |
| 2014/0035736 A1 | 2/2014 | Weddle et al. |
| 2014/0129059 A1 | 5/2014 | Scarlatti et al. |
| 2014/0303814 A1 | 10/2014 | Burema et al. |
| 2014/0319272 A1 | 10/2014 | Magana et al. |
| 2015/0069968 A1 | 3/2015 | Pounds |
| 2015/0097530 A1 | 4/2015 | Scarlatti et al. |
| 2016/0011592 A1 * | 1/2016 | Zhang ................ G05D 1/102 701/2 |
| 2016/0039542 A1 * | 2/2016 | Wang ................ B64F 1/18 701/2 |
| 2016/0122038 A1 | 5/2016 | Fleischman et al. |
| 2017/0096075 A1 | 4/2017 | Henry et al. |
| 2017/0120763 A1 | 5/2017 | Henry et al. |

* cited by examiner

METHODS FOR RECONFIGURABLE POWER EXCHANGE FOR MULTIPLE UAV TYPES

CROSS-REFERENCE TO RELATED APPLICATIONS

This application is a divisional of U.S. patent application Ser. No. 15/285,820 filed Oct. 5, 2016 (now U.S. Pat. No. 9,969,285), which claims the benefit of priority to U.S. Prov. Apps. 62/237,245 filed Oct. 5, 2015, and 62/265,703 filed Dec. 10, 2015, each of which is incorporated herein by reference in its entirety.

BACKGROUND OF THE INVENTION

Unmanned Aerial Vehicles (UAVs) are increasingly being used for commercial applications. Examples include, but are not limited to, inspections of railway lines, inspection of electrical power lines, monitoring of quarry sites and construction sites. Larger than consumer UAVs, commercial UAVs are commonly powered by, but not limited to, batteries. Currently, the primary limitation of the range and capabilities for commercial UAVs is battery technology. With the latest breakthroughs and higher power densities, UAVs are capable of up to around 30 minutes of flight with a useable payload. Current UAVs require manual exchange of said power systems, requiring a man in the loop for every flight. While rendering the UAV effective for consumer use, battery technology and the automation of exchanging them is the key limiting factor to the commercial realization and wide-spread use of UAVs.

SUMMARY OF THE INVENTION

The Reconfigurable Power Station (RPS) for Multiple UAVs is designed to extend the range and capabilities of multiple, and possibly disparate, unmanned systems. In this embodiment we discuss in detail the RPS system when interfacing with UAVs. The RPS system will detect a signal from a UAV requiring a new Swap Cartridge (SC), and using identifiers, including vehicle type, vehicle SC, status of SC, and vehicle location, will make a determination for landing. As the vehicle closes to within a threshold distance of the RPS, which may include, but are not limited to 1 foot, 3 feet, 6, feet, 10 feet, 20 feet, etc. above the station, the UAV will be guided to the RPS utilizing sensors embedded into the Universal Integrated Swap system (UIS) onboard the vehicle and a series of visible or non-visible illuminators embedded into the landing zone deck to make final approach and land. Once landed, the RPS will deploy a landing gear retention system to mechanically and electrically connect to it. This is but one embodiment of the RPS as this problem is not limited to UAVs, but to many forms of unmanned systems, including, but not limited to, ground vehicles, underground vehicles, water surface vehicles, underwater vehicles, and space vehicles.

The RPS System is designed to house multiple power cartridges, in one or multiple modular power bays. These modular power bays are designed to be self-contained housing and replenishment units. Modular Power Bays (MPBs) are capable of housing multiple types and sizes of SCs, and may include, but not limited to, electric batteries, hydrogen fuel-cells, or fossil fuels. The data the RPS received prior to the UAV landing may enable the onboard processing system to make a determination and select the appropriate type and quantity of SCs. Utilizing a transfer system coupled with an elevator, SCs are transferred from the MPBs to the landing zone. An example embodiment of the described system is: The SC transfer mechanism moves to locate the UIS on the landed UAV. Once located, the swapping mechanism withdraws the depleted SC from the system and moves the SC to an available MPB, inserting it for replenishment. Following the transfer of the SC, the swapping mechanism moves to a bay with the appropriate replacement SC for the UAV, as directed by the onboard processing system, and retrieves a fully energized SC. From there it will be elevated to the landing zone via an elevator or other mechanical actuation system. Once the swapping mechanism locates the UIS, it inserts the energized SC into the Swap Cartridge Receptacle (SCR) onboard the UAV. With the SC swap complete and the swapping mechanism stored below the landing zone deck, the UAV departs the RPS and resumes its flight.

In one embodiment, a power station for unmanned aerial vehicles may generally comprise an enclosure defining a surface and an interior, and a landing zone positioned upon the surface and sized to receive one or more UAV types, wherein the landing zone has one or more markers or emitters configured to generate one or more composite images when a UAV is in proximity to the landing zone.

In another embodiment, the reconfigurable power station for unmanned aerial vehicles may generally comprise a housing defining a surface, a modular power bay positioned within the housing, the modular power bay defining one or more receiving bays for retaining a corresponding power cartridge, a landing zone positioned upon the surface and sized to receive one or more UAV types, wherein the landing zone has one or more markers or emitters configured to generate one or more composite images when a UAV is in proximity to the landing zone, and a central processor in communication with the one or more markers or emitters.

One method of swapping a power supply in an unmanned aerial vehicle may generally comprise emitting one or more composite images to a UAV via one or more markers or emitters when the UAV is in proximity to a landing zone located on a reconfigurable power station (RPS), determining an orientation of the UAV relative to the landing zone after the UAV has landed, removing a first swap cartridge from the UAV via a swapping mechanism within the RPS, and installing a second swap cartridge from the RPS and into the UAV.

In yet another embodiment, a UAV reconfigurable power station (RPS) may generally comprise a dynamic terminal landing system (DTL) configured to support autonomous landing of a UAVs on a landing zone, wherein the DTL comprises a UAV landing zone that is reconfigurable for multiple UAV types and sizes and is further configured to support landing, exchanging a swap cartridge, and take-off operations; a power source capable of powering a UAV flight system once on the landing zone; one or more modular power bays (MPBs) capable of housing multiple instances of a given universal swap cartridge (SC); a universal swap cartridge swapping mechanism configured for manipulating multiple SC types and sizes; a RPS central processor (CP) configured to support operations of the RPS; and a sensor positioned within the RPS.

Additionally, the RPS may further comprise a universal swap cartridge processor (USP) configured to interact with the RPS; one or more universal swap cartridge receptacles (SCRs) configured to mechanically and electrically connect a SC to a UAV; one or more SCs; and an external marker positioned on the SC that allows the RPS to determine a position of the SC after the UAV has landed to allow for swapping of a depleted SC.

In yet another embodiment, a UAV reconfigurable power station (RPS) may generally comprise a UAV landing zone that is reconfigurable for multiple UAV types and sizes and is further configured to support landing, exchanging a swap cartridge, and take-off operations; a dynamic terminal landing system (DTL) configured to support autonomous landing of UAVs on a landing zone; a power source capable of powering a UAV flight system once on the landing zone; one or more modular power bays (MPBs) capable of housing multiple instances of a given universal swap cartridge (SC); a universal swap cartridge swapping mechanism configured for manipulating multiple SC types and sizes; a RPS central processor (CP) configured to support operations of the RPS; and sensors positioned within the RPS.

Additionally, the RPS may further comprise a universal swap cartridge processor (USP) configured to interact with the RPS; one or more universal swap cartridge receptacles (SCRs) configured to mechanically and electrically connect a SC to a UAV; one or more SCs; and an external marker positioned on the SC that allows the RPS to determine a position of the SC after the UAV has landed to allow for swapping of a depleted SC.

Additionally, the RPS may also further comprise a landing zone having visible or non-visible markers to create a composite image to aid in the landing of the UAV; and a composite image utilizing visible or non-visible illuminators on or embedded in the landing zone which are configured to form scalable composite images in response to a UAV type and altitude above the RPS landing zone.

In yet another embodiment a Universal Swap Cartridge Processor (USP) may generally comprise a housing configured to be integrated into a UAV flight controller or airframe; a processor within the housing and configured to control an automated landing and launch of a UAV from an RPS; an external transmitter capable of wirelessly transmitting a power source health and identifying data of an SC to the RPS, other UAVs in proximity, or other ground stations; an external receiver capable of wirelessly receiving data from the RPS, other UAVs in proximity, or other ground stations, wherein the USP is configured to relay data to a UAV or UAV flight controller; and one or more cameras configured to capture visible and/or non-visible data from a landing zone located on an RPS.

BRIEF DESCRIPTION OF THE DRAWINGS

The detailed description is described with reference to the accompanying figures.

DETAILED DESCRIPTION OF THE INVENTION

The following is a detailed description of an embodiment of the invention, as well as the systems and methods utilized in order to provide extended capabilities to UAVs. It is understood that the various embodiments of said invention are considerate of the functional capabilities of various UAV scales and frames. An example would include proportionally smaller aerial vehicles that have varied acceptable flight conditions for safe operation. In consideration of the device having universal applications, the parts and complexity of the associated system may vary depending upon the applied platform. Other embodiments of the RPS 100 system may be able to fulfill a similar role to the embodiment described here with respect to other unmanned systems, including but not limited to, surface vehicles, underground vehicles, water surface vehicles, underwater vehicles, and space vehicles.

Figure 1A:
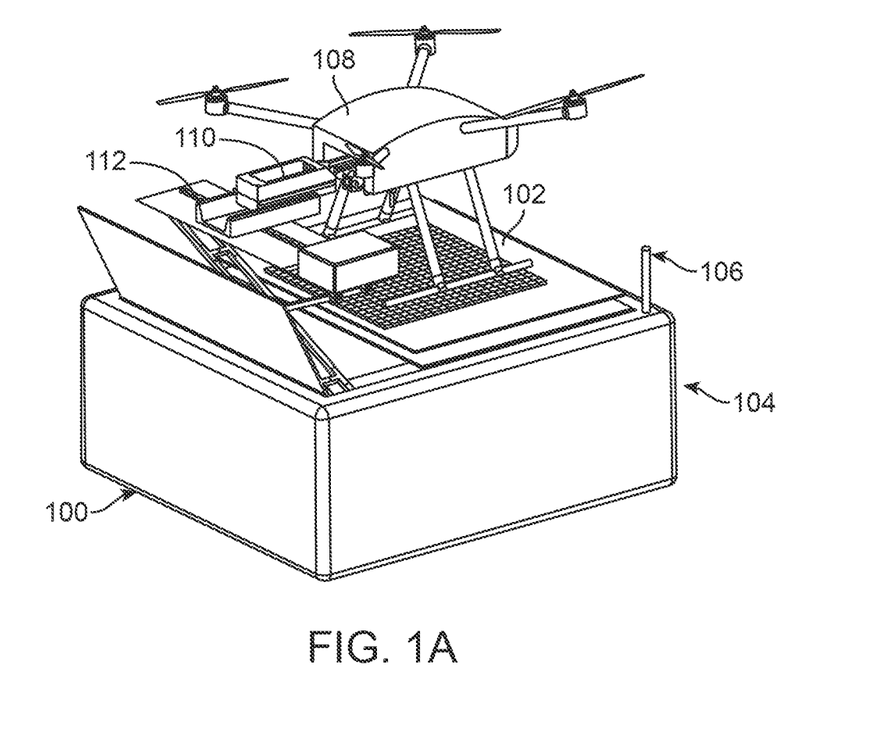
FIG. 1a is a perspective view of one embodiment of the Reconfigurable Power Station (RPS) including an unmanned aerial vehicle (UAV) in use of the station.

The utilization of a reconfigurable power system in this embodiment, as shown in the perspective view of FIG. 1a, is intended to extend effective flight range and flight time of a desired UAV 108 by offering a universal system in which UAVs 108 are capable of exchanging depleted universal Swap Cartridges (SCs) 110 for energized cartridges. One variation of a SC 110 may comprise a power supply or power cartridge in which a depleted power cartridge may be exchanged for an energized power cartridge. The various embodiments of SC 110 are not intended to be limiting as various other types of payloads may be utilized as swappable cartridges. The Reconfigurable Power System (RPS) 100 is intended to be a fully autonomous solution for SC 110 exchange. The RPS, which is capable of communications with the UAV 108 via the Universal Integrated Swappable system (UIS) 300 installed aboard the UAV 108, may be contained within a housing or an environment enclosure 104 and will detect whether the user or mission control of said UAV 108 determines the desire for exchange of a SC 110 and will engage the UAV 108 into the SC 110 exchange protocol.

In the considered embodiment of the RPS 100, one can be comprised of, but not limited to, a UAV landing zone 102 configurable for a multitude of UAV types and sizes, a dynamic terminal landing system (DTL) for autonomous UAV landing, a power source capable of powering the UAV flight control system when landed 600 (as described in further detail in FIG. 6 herein), a modular power bay (MPB) 700 which may house multiple SCs 110, a universal SC swapping mechanism 112 to advance the exchange of multiple SCs 110, a central processor 218, and associated sensors 222 allowing appropriate tracking/detecting of the UIS 300 aboard the UAV 108, as described in further detail below. The swapping mechanism 112 may be contained within the environment enclosure 104 when not in use but may be deployed through an opening door or mechanism and automatically positioned into proximity to the UAV 108 when swapping the SC 110. An RPS 100 may be deployed in any number of environments 200 of which include, but are not limited to, farms, fields, deserts, industrial plants, water banks, and urban zones. The RPS 100 may be controlled directly in close physical proximity or remotely. A transmitter and receiver 106 may be integrated with the RPS 100 to facilitate wireless communications, e.g., with the UAV 108 or with a remotely located controller or interface. An internal power source 206 allows for operations without an external power source 202 for a set period of time. RPS 100 may have provisions for various types of external power 202 including, but not limited to: electrical grid, hydrocarbon generator, or solar power.

Figure 1B:
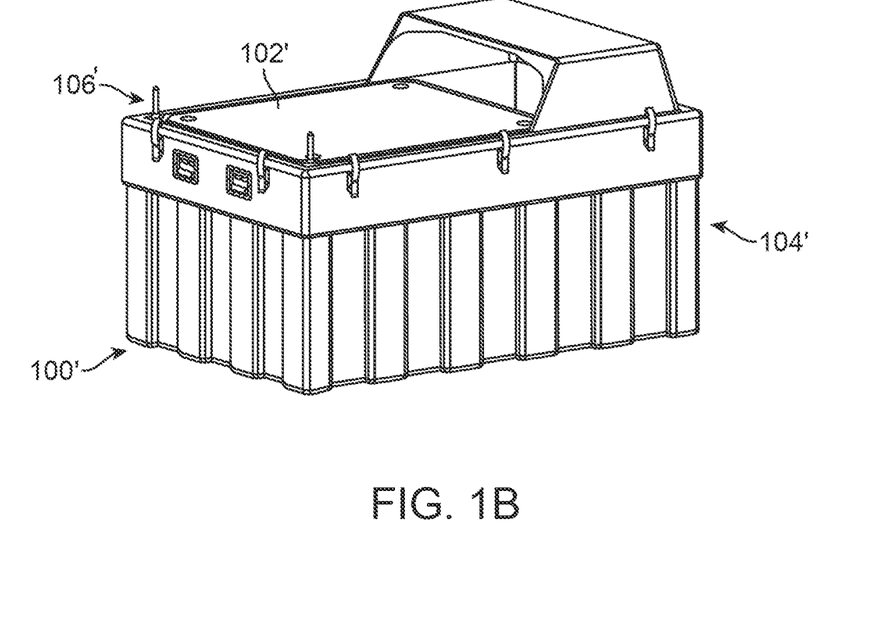
FIG. 1b is a perspective view of another embodiment of the RPS.

FIG. 1b illustrates a perspective view of another embodiment of an RPS 100' which may also incorporate the housing or environment enclosure 104'. The UAV landing zone 102' may be positioned atop the enclosure 104', as above, and the enclosure 104' may also incorporate a transmitter and receiver 106 to facilitate wireless communications. While the RPS 100 described above incorporates a landing zone 102 and a swapping mechanism 112 deployable from within the enclosure 104, the RPS 100' embodiment may incorporate the swapping mechanism in a housing which is positioned or positionable adjacent to the UAV landing zone 102'.

Figure 3A:
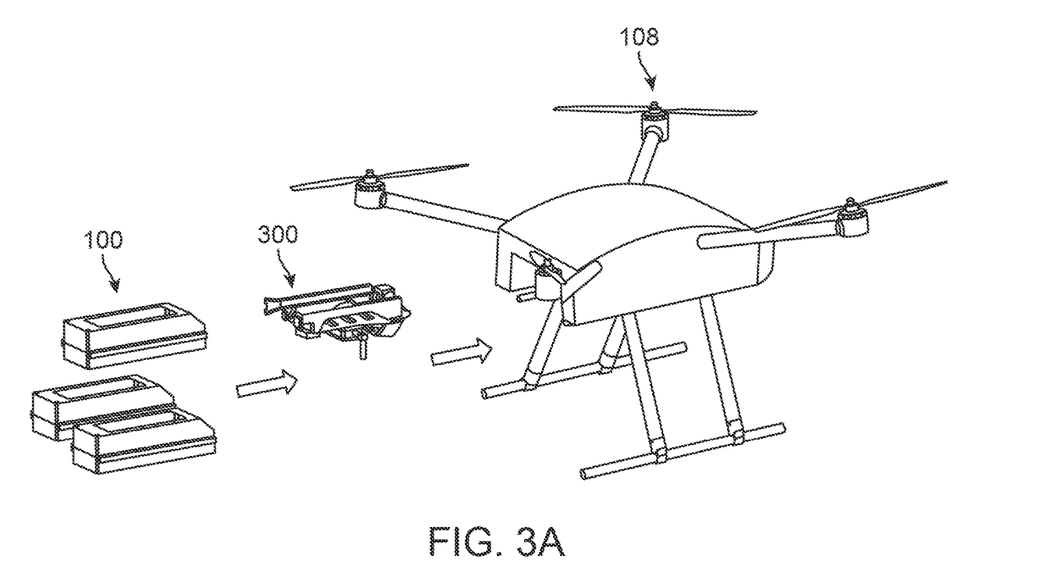
FIGS. 3a-3b are illustrations of an embodiment of a Universal Integrated Swap System (UIS) for an unmanned aerial vehicle embodiment.
Figure 3B:
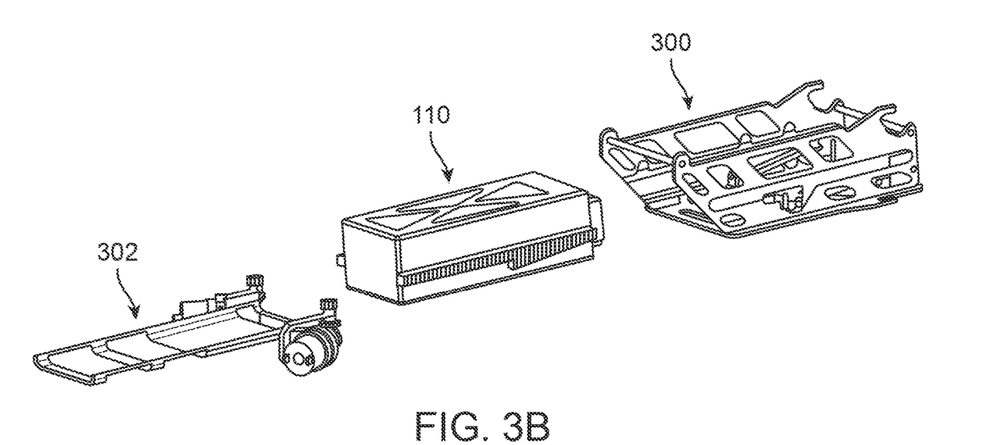
Figure 11:
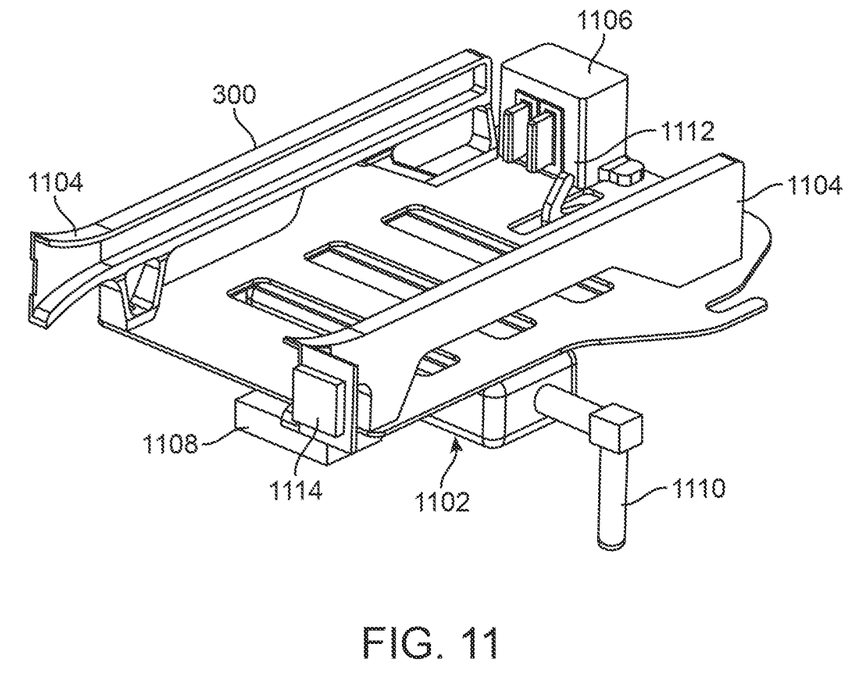
FIG. 11 is a perspective view of a Universal Integrated Swap system (UIS) and associated features in accordance with embodiments.

The aforementioned UIS 300, which is illustrated as an assembly in FIG. 11, is adaptable or otherwise securable to the independent frame of the UAV 108 utilizing the capabilities of the RPS 100. The assembly of the UIS 300, in one embodiment, may be implemented as illustrated in the perspective views of FIGS. 3a and 3b. As shown in FIG. 3a, the UIS 300 is illustrated in an assembly view relative to the UAV 108 and multiple SCs 110 are also shown as being insertable or attachable within the UIS 300. As illustrated in the assembly view of FIG. 3b, the UIS 300 (shown detached from the UAV 108 for illustrative purposes), generally forms a receiving structure having a universal Swap Cartridge Receptacle (SCR) 1104 which may have one or more receiving guides defined. A SC swapping adapter 302 (and described in further detail below) may be deployed from the RPS 100 while carrying a SC 110. When the UAV 108 has landed upon the platform 102 and is ready to receive a SC 110, the SC swapping adapter 302 and SC 110 may be aligned with the receiving channel of the UIS 300 which may then receive the SC 110 for electrical coupling.

Included as part of the UIS 300 assembly may be a Universal Swap Processor (USP) 1102, one or more SCRs 1104, one or more SCs 110, and an external marker 1114 for identification and tracking of the UIS 300, as further shown in FIG. 11. A UIS 300 may be directly integrated into a given UAV 108 structure by an Original Engineering Manufacturer (OEM) or adapted to an existing UAV 108 structure. An example embodiment of a directly integrated UIS 300 may have the SCR 1104 merged with the primary structure, the UPP 1102 part of the flight controller board, and the optical sensor 1108 integrated directly into the exterior of the vehicle. A UIS 300 is utilized by the UAV 108 for interaction and SC 110 swapping with an RPS 100. Furthermore, the USP 1102 may comprise one or more cameras which are configured to capture the visible and/or non-visible data (e.g., one or more composite images which are scalable) transmitted from the landing zone 102. Within a UIS 300, SCR(s) 1104 may be electrically connected to the USP 1102 to provide SC data including, but not limited to, SC health, SC power status, SC payload status, and SC type. The previous embodiment is capable of being powered by the embedded battery that is a part of the USP 1102 while SC(s) 110 are not installed in the system.

Figure 8A:
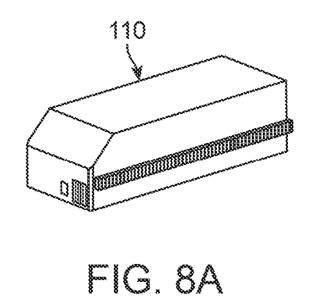
FIGS. 8a-8b are perspective views of example embodiments of an assembled SC.
Figure 8B:
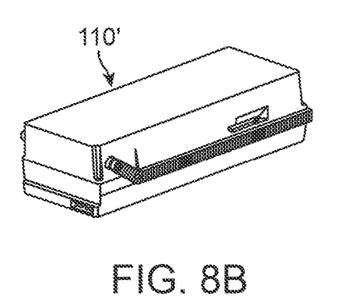
Figure 9A:
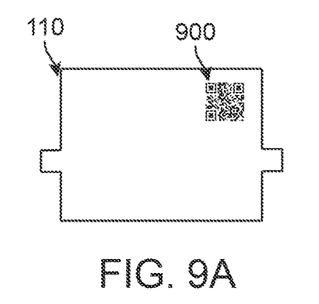
FIGS. 9a-9b are rear views of example embodiments of an external marker fixed to the surface of an SC.
Figure 9B:
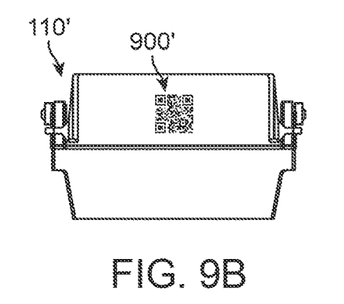

The aforementioned universal Swap Cartridge (SC) 110, which is illustrated in the variations of FIGS. 8a and 8b, is compatible with the associated UIS 300 and provides power or payload to the equipped UAV 108. The variation shown in FIG. 8a may incorporate a housing or external sleeve 1010 having a tapered portion while the variation shown in FIG. 8b may have a housing or external sleeve 1010' which is non-tapered. The SC 110 is designed, but is not limited, to provide power to the equipped UAV 108 propulsion system. An embodiment as shown in FIGS. 8a and 8b could include one or more power and/or signal connectors 1000, programmable storage and data mediums 1002, desired power storage medium, desired payload, paired tracks 1008 for mating with and removal from the UIS 300, unique identifiable marker 900, and mechanical locking mechanism 1006. The end views of FIGS. 9a and 9b illustrate the unique identifiable markers 900, 900' (e.g., 2-dimensional or 3-dimensional barcodes, etc.) positionable upon the external housing for optical reading and recognition. The paired tracks 1008 which are positioned along the sides of the housing or sleeve 1010 and extend longitudinally may be comprised of one or more projections (such as a rack gear) for providing traction when received by the SCR(s) 1104 of the UIS 300.

Figure 10A:
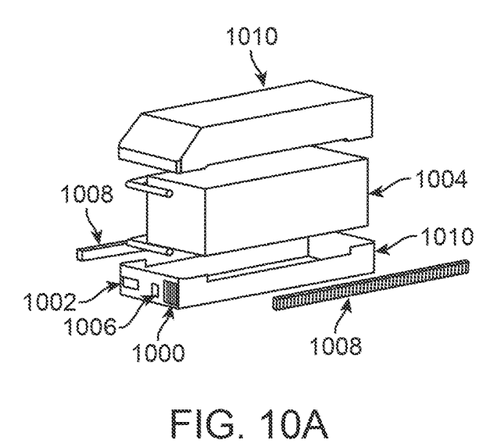
FIGS. 10a-10b are exploded views of example embodiments of an SC.
Figure 10B:
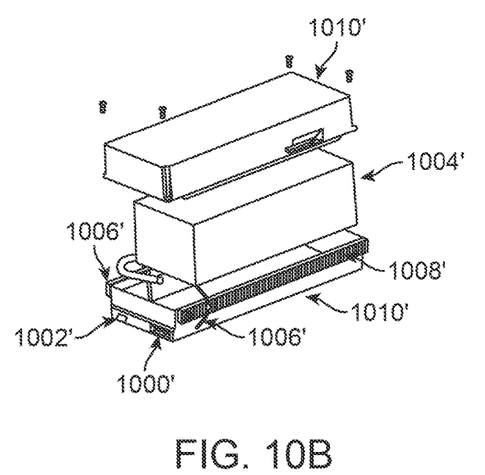

Primary construction of a SC 110 is defined as a housing or an external sleeve 1010 that houses the desired medium 1004, which includes but is not limited to, battery, fossil fuel, fuel cell, or payload, as shown in the exploded assembly view of FIGS. 10a and 10b. Additionally, SCs 110 may contain more than one power medium 1004 within the case to be able to facilitate more alternative systems, including but not limited to, hybrid propulsion systems. The connectors 1000 integrated into the SC 110 is electrically connectable to the electrical connectors 1106 positioned within the UIS 300 (as shown in FIG. 11) and when connected will be able to transfer power or applicable data that is unique to the individual SC 110. This information may include: power source data, power sources specification, power sources health data, payload status, payload data, UAV type, compatibility type, serial numbers, product numbers, and/or owner. The SC 110 may contain a unique marker 900 which stores pre-programmed information. This pre-programmed information may assist identifying the type and compatibility of the observed SC 110. Furthermore, the marker 900 may assist in the location of one or more SCs 110 and removal of said SCs 110 from the landed UAV 108. The SC 110 may alternatively house internal markers, such as RFID tags, acting similarly to the aforementioned unique external marker 900. Data pulled from the SC 110 may be stored locally at the RPS 100 and may be used internally by the RPS 100 system in operation and/or accessed remotely by an operator or external system.

Unique external features, such as smooth rails or racks 1008, are implemented to allow facilitation of installation, storage, and removal of said SCs 110. In order to ensure proper containment, provisions, such as, but not limited to, a physical interface may be implemented for mechanical locking of individual SCs 110 within the UIS 300 during flight of a UAV 108, landing of a UAV 108, UAV 108 resting on stationary or mobile platform, or storage within a modular power bay. A SC 110 may be a variety of sizes to accommodate the variety of UAV designs and types. Upon an external power source supplied to a RPS 100, a SC 110 housed in a MPB 700 will be energized to nominal conditions. Said energized SC 110 may remain physically constrained and may be stored in nominal conditions. The embodiment in FIG. 10*b* shows components which are numbered similarly with corresponding components as shown in FIG. 10*a*.

The aforementioned universal Swap Cartridge Receptacle (SCR) 1104, which is illustrated in FIG. 11, is compatible with all proposed SC 110, MPB 700, and UIS 300 components. The SCR 1104 may be comprised of, but is not limited to, a positive mechanical solution for mechanical containment of SCs 1112, electrical connectors 1106 for transmission of power and/or signal transmissions of associated SCs 110, and physical features to accommodate various UAV styles and sizes. A SCR 1104 may be responsible for supplying power from a connected SC 110 to a UAV 108. A SCR 1104 is responsible for mechanically retaining a SC 110 during all modes of flight. A single or multiple instances of a SCR 1104 may be used on a single UAV 108.

The aforementioned USP 1102, which is illustrated in FIG. 11, is compatible with associated UISs 300 and SCs 110. A USP 1102 may be composed of, but is not limited to, a processor to facilitate communication between RPS 100 and UAV 108, an external electromagnetic transmitter 1110 capable of system and SC data transfer, an external receiver 1110 capable of communication with one or more RPSs 100, UAVs 108*s* in proximity, and/or other stations, a relay for commands from pilot to flight controls and vice versa, one or multiple sensors for visible and/or non-visible data from RPS 100 or environment, and an embedded battery to facilitate system functions independent of the SC 110. A USP 1102 utilizes a wireless protocol to communicate with an RPS 100, and is designed to transmit data, which may include SC health data, SC type, and payload data. The USP 1102 may act as a pass-through for flight input data between external sources and the flight controller on a UAV 108. A UPP 1102 system may be designed to be installed on multiple UAV 108 types and multiple UAV 108 sizes. These installations may be directly integrated into the UAV 108 frames.

Figure 6:
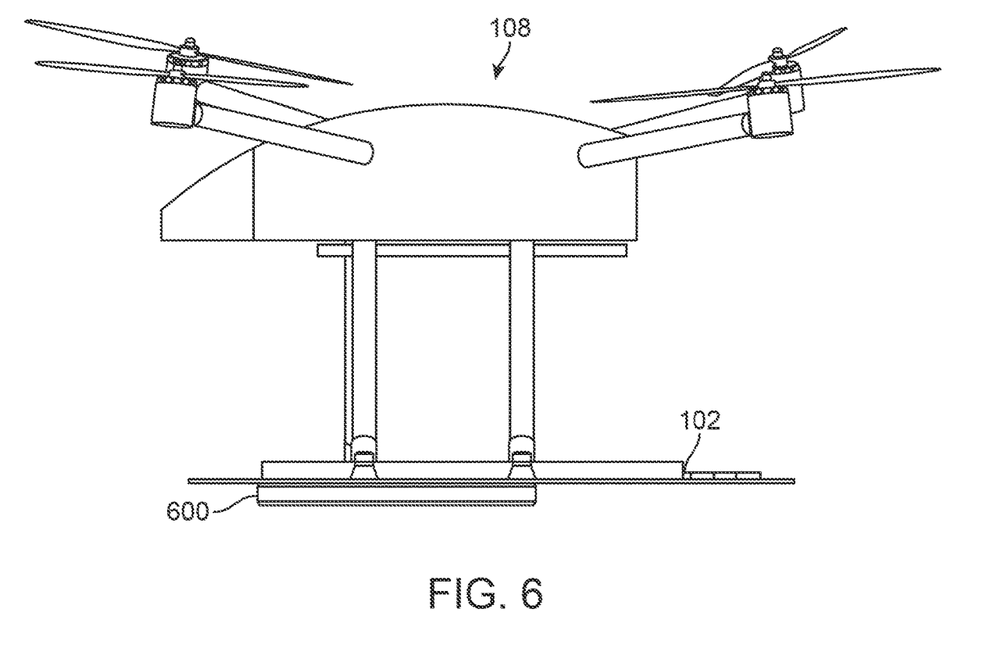
FIG. 6 is a side view of a shore power system supplying power to a landed UAV in accordance with embodiments.
Figure 7A:
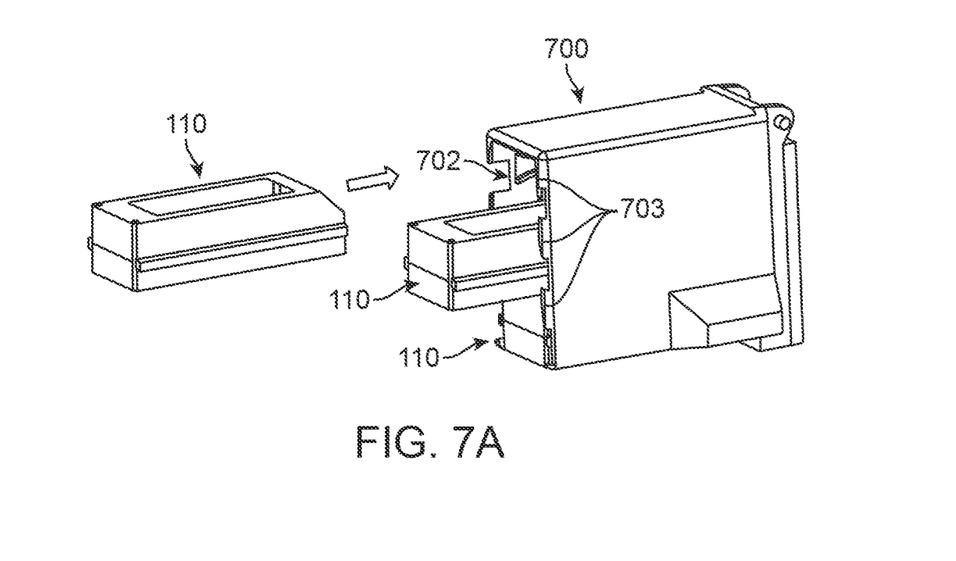
FIGS. 7a-7b are perspective views of example embodiments of a modular power bay and associated SCs.

The aforementioned Landing Zone 102, which is illustrated in the side view of FIG. 6, is designed for the purpose of physically supporting and restraining a UAV 108 while landed at an RPS 100 during a SC 110 exchange. It may be designed to secure a UAV 108 for a period of time via one or more mechanical retaining mechanisms which may temporarily attach or otherwise secure the UAV 108 during swapping of the SC 110, e.g., via securement with the landing gear of the UAV 108. The landing zone 102 is designed to supply power to the UAV 108 during the SC 110 exchange, including but not limited to, powering flight control systems and payloads via the UIS 300 which may be done through an electrical and/or mechanical engagement mechanism 600. The landing zone 102 may accommodate one or more UAVs 108*s* simultaneously. The RPS 100 may have one or more landing zones 102.

Figure 5A:
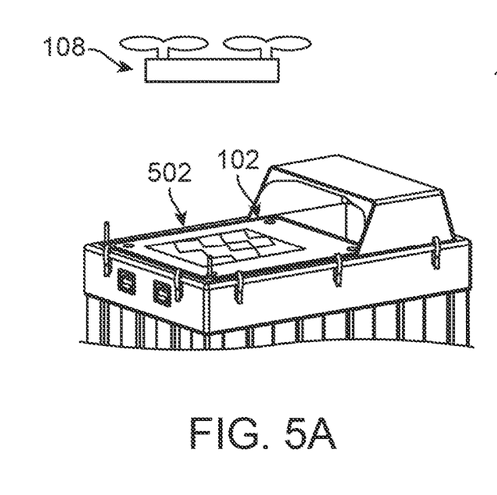
FIGS. 5a-5b are perspective views of the dynamic terminal landing system in accordance with embodiments.
Figure 5B:
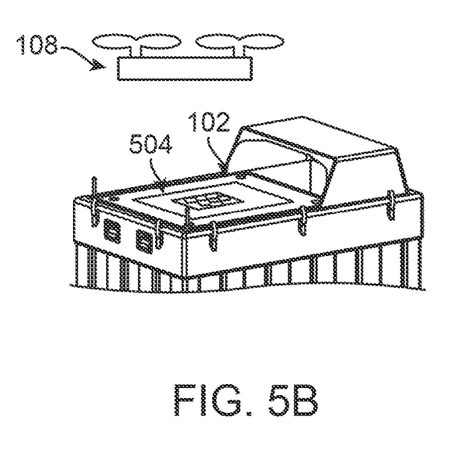
Figure 5C:
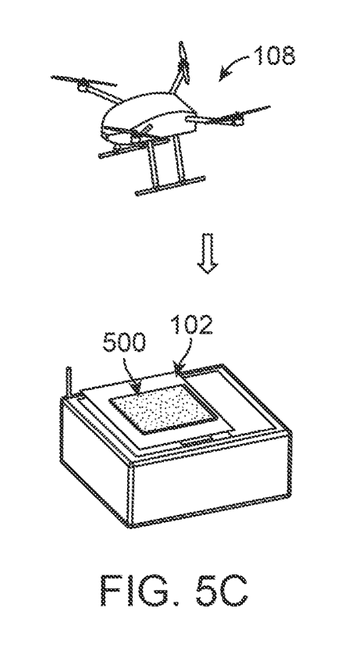
FIGS. 5c-5e are perspective views of another variation of the dynamic terminal landing system (DTL).
Figures 5D, 5E:
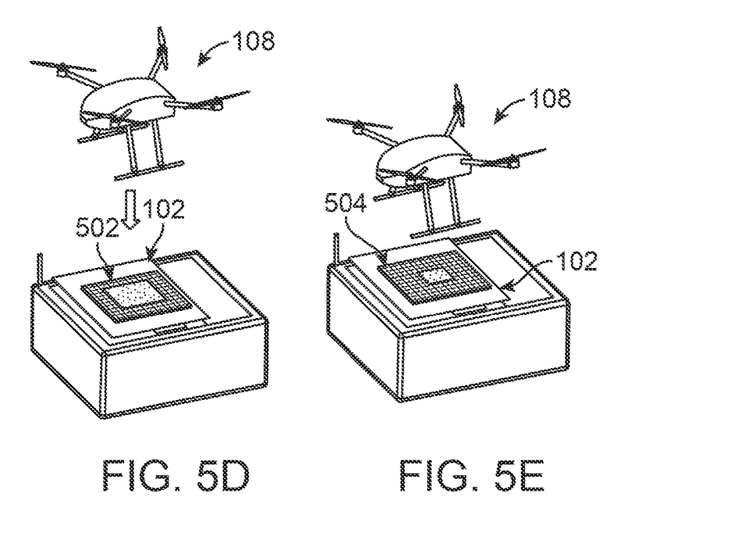

The aforementioned Dynamic Terminal Landing system (DTL), which is illustrated in FIGS. 5*a* to 5*e*, may be comprised of, but not limited to, landing deck(s) 102 and one or more visible or non-visible markers/emitters 500, 502, 504 capable of generating composite images. This system of markers may be arranged in patterns or arrays that allow the system to create identifiable imagery. The composite imagery can be superficial or embedded into the landing deck 102, of which may or may not be a smooth or textured surface to aide in landing. The composite imagery size are scalable and may vary from, e.g., 1 inch by 1 inch and be as large as 26 inches by 26 inches, or larger. For example, a composite image may be a QR barcode or AprilTag. Depending upon a UAV's 108 location above a RPS 100, the composite image may change its size (e.g., in real-time) to aide in the landing of the UAV 108 depending on the distance to the UAV 108, as shown in the perspective view of FIGS. 5*a* and 5*b*, which shows a predetermined pattern upon the landing zone 102 which may be reduced in size in a corresponding manner as the UAV 108 approaches the landing zone 102. These distances may include, but are not limited to, e.g., 1 foot, 3 feet, 6, feet, 10 feet, 20 feet, etc. above the station. Dependent upon the drone type and size, the image displayed for landing may change to optimize the landing of said vehicle. Dependent upon the height of the system, the composite images may move in addition to vary in size in aiding in the landing of the UAV 108. The DTL is capable of operating on the internal power of the RPS 100. Similarly, FIGS. 5*c* to 5*e* illustrate how the visible or non-visible markers/emitters 500, 502, 504 may change its pattern and/or change in size as the UAV 108 approaches the landing zone 102.

Figure 7B:
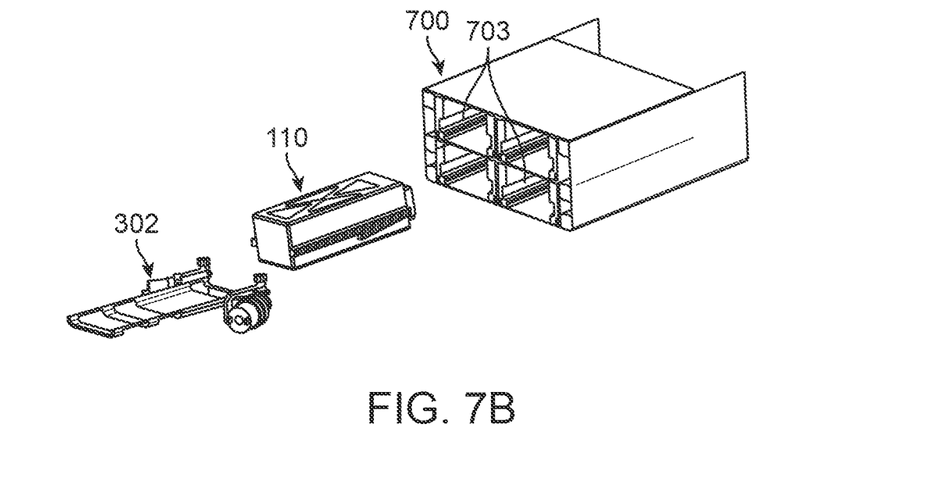

The aforementioned Modular Power Bay (MPB) 700, which is illustrated in FIGS. 7*a* and 7*b*, is capable of housing multiple instances of SCs 110 within itself for storage or replenishment and is stored within the RPS 100. Universal Swap Cartridge Receptacle (SCR) 1104 installations within the MPB 700 allow for SCs 110 to be utilized similarly as the UIS 300. A MPB 700 may contain a homogenous or heterogeneous mixture of SC types and may contain one or more SCs 110 at any point in time. MPBs 700 are defined as line replaceable units (LRUs), which allow for one or more MPBs 700 to be transported, installed, or utilized within one or more RPS 100*s*. With the MPB 700 being an LRU, it allows for variable SC 110 storage within a RPS 100, thus providing the possibility of servicing a multitude of UAV 108 types and sizes from the same or joined network of RPS 100*s*. Utilization of a MPB 700 separate from the box can allow for standalone transportation and servicing of SCs 110 or MPBs 700. Furthermore, the MPB 700 may be configured to store the one or more SCs 110 in various configurations. For instance, FIG. 7*a* shows one variation where the MPB 700 may be configured to store the SCs 110 in a stacked manner where the individual receiving bays 703 may be positioned atop one another. FIG. 7*b* shows a perspective view of another arrangement where the receiving bays 703 of the MPB 700 may be aligned in a symmetric arrangement, for example, in a two-by-two arrangement as shown. Depending on the positioning of the receiving bays 703, the SC swapping adapter 302 may be positioned in proximity to the appropriate bay 703 for storage or retrieval of an SC 110.

The aforementioned SC Swapping Mechanism 112, which is illustrated in FIG. 1, may be adjustable to receive a multitude of SCs 110, which may be used with a multitude of UAV 108 sizes and types. The swapping mechanism 112 may be implemented with an array of sensors or detectors to allow for the determination of the UIS 300 location. The capabilities of said mechanism 112 permit the exchange of one or more SCs 110. The exchange of SCs 110, via the swapping mechanism 112, is facilitated between one or more depleted SCs 110 of a UAV 108. Said depleted SCs 110 may be exchanged with one or more of any desired replacement SCs 110, of which are stored within the MPBs 700 of the RPS 100. The swapping mechanism 112 may facilitate motion for transfer with inertia of a depleted SC 110. The swapping mechanism 112 is also capable of facilitating SC swap via an elevating system or another mechanical solution. The swapping mechanism 112 may facilitate advancement of a SC 110 with the motion of a rotary system. This system allows for the removal and loading of a SC 110 into a UIS 300 and a MPB 700. The RPS 100 that the swapping mechanism 112 is housed within is capable of facilitating SC exchange of the UAV 108 while it is positioned and at rest on an associated DTL.

Figure 2A:
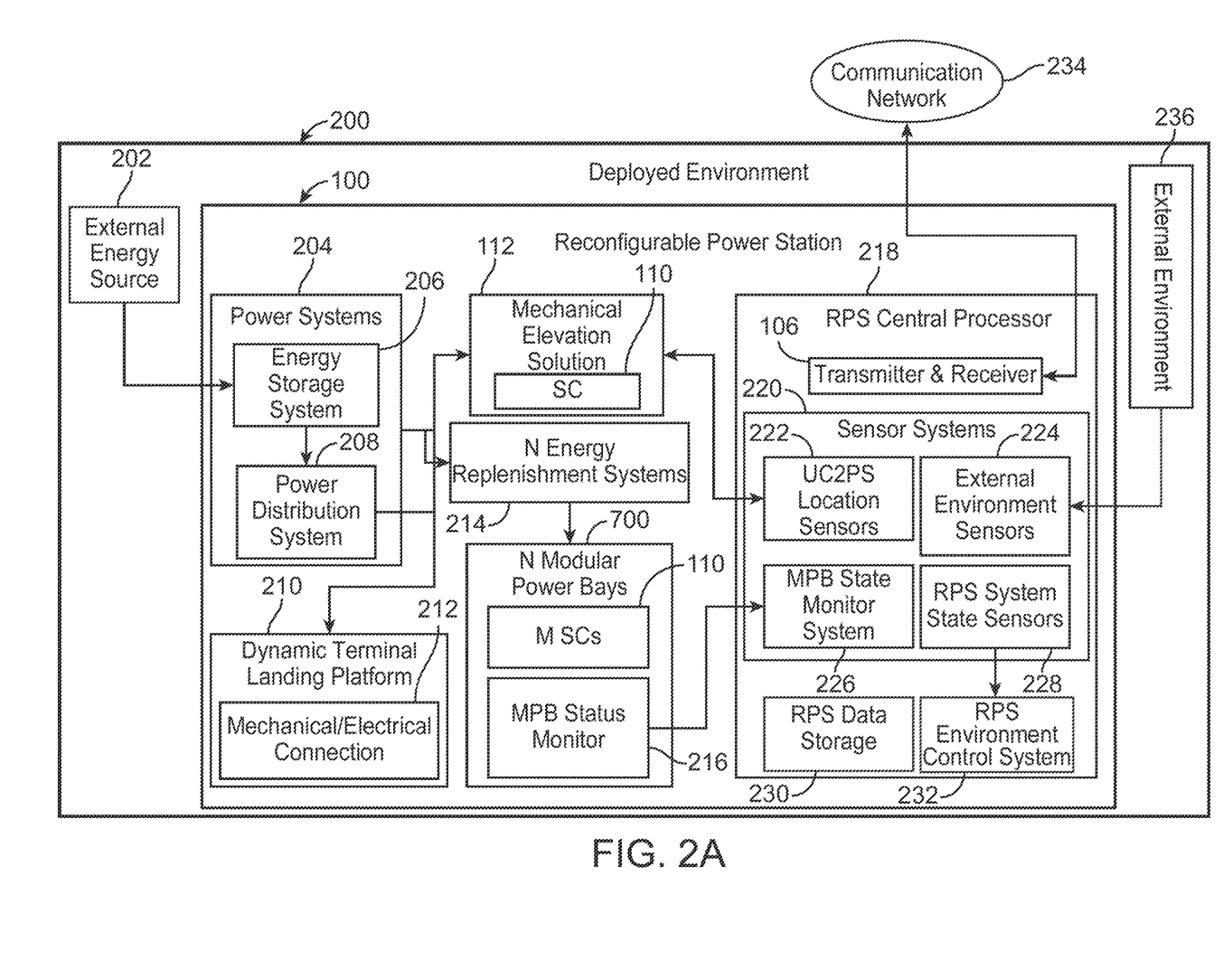
FIGS. 2a-2b are schematic illustrations of a block diagram of subsystems that constitute an example embodiment of a RPS.
Figure 4A:
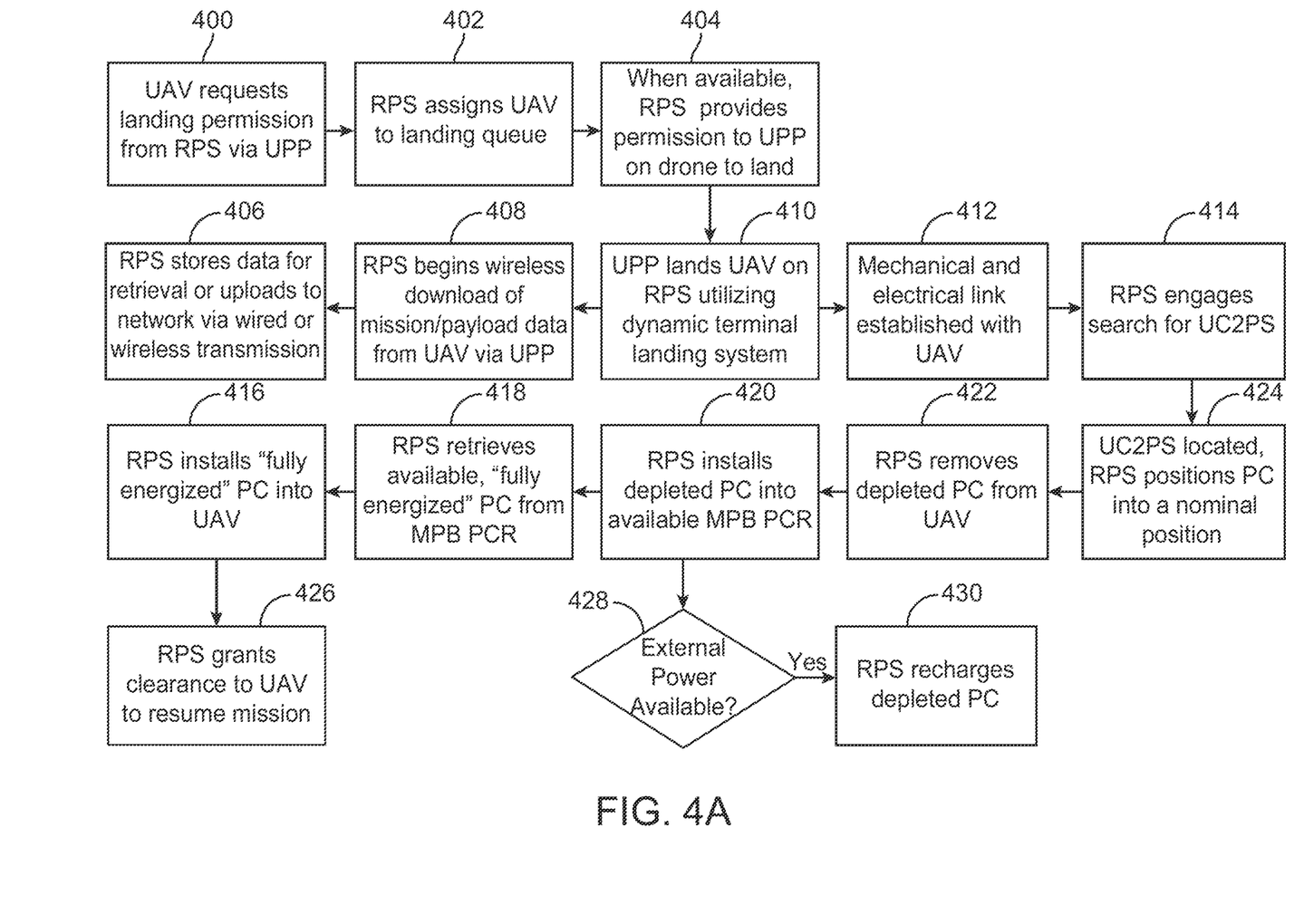
FIGS. 4a-4b are schematic illustrations of a block diagram of the methodology for a swap cartridge (SC) exchange on an embodiment of an RPS.

The aforementioned Reconfigurable Power System Central Processor (RPS-CP) 218 is utilized within the RPS 100 to facilitate the system functions of the RPS 100, as shown in the schematic diagram of FIG. 2*a*. These functions may include, but are not limited to, external/internal environmental monitoring 224, environmental control system (ECS) control 232, UIS data transfer, RPS data storage 230, safety systems control, and MPB and SC state monitoring 226. RPS-CP primary function is to coordinate and execute the swapping of SCs 110 for a UAV 108 as described in FIG. 4.

During normal operations of an RPS 100, the RPS-CP may be observing environmental conditions. These conditions include both conditions within/on the RPS 100 and conditions about/around the RPS 100. The conditions around the deployed RPS 100 that may be monitored could include, but are not limited to, ambient temperature, ambient pressure, ambient wind speed, ambient wind direction, ambient humidity, and visibility. These conditions, in accordance with predetermined limitations for the UAV 108, may determine the flight readiness of the UAV 108 for a mission at any given time. The conditions detected by the RPS 100 and the vehicle of which is to be deployed or stationed may be communicated via the RPS-CP to the UAV 108, the RPS 100, and/or a command center determined preferred by the user. The flightworthiness determination of any specific UAV 108 or its mission may be communicated via the RPS-CP to a mission planner or a central command center. Within the RPS 100, the RPS-CP will be observing various environmental conditions in order to provide ideal operating and storage conditions of all the functioning systems that may be enclosed within an RPS 100.

In accordance with all aforementioned, and any more appropriate installed systems, the system observed data monitored by the RPS-SC may be retained in an internal storage medium 230. This data storage medium may be located within the RPS 100 or in communication of the RPS 100. Communications with the RPS 100, with any form of desired data network or any connected device, wired or wireless, may be conducted via a transmitter and receiver 106 on board the RPS 100. This transmitter and receiver 106 may be controlled via the RPS-CP to access desired information from the RPS 100 and all its associated systems.

Generally, the RPS 100 can be seen in the schematic illustration of FIG. 2*a* showing an example of the RPS 100 within a deployed environment 200. The RPS 100 may be in electrical communication with an external energy source 202 which may charge or power an internally contained energy storage system 206 which is contained within the power system 204. The energy storage system 206 may distribute power via a power distribution system 208 to the various components within the RPS 100 such as the dynamic terminal landing platform 210 as well as the mechanical elevation solution 112. The dynamic terminal landing platform 210 may include a mechanical and/or electrical connection 212 which may temporarily couple to the UAV 108 after landing on the UAV landing zone 102 in reference to the electrical and/or mechanical link 600 shown in FIG. 6.

The mechanical elevation solution 112 may facilitate the transport of the SC 110 from one of the preselected modular power bay 700 (e.g., N modular power bays) which may also be in communication with an energy replenishment system 214 which may charge the one or more SC 110 contained within the modular power bay 700. The MPB status monitor 216 may also be incorporated within the modular power bay 700 for obtaining a status of each of the SC 100.

As described above, the RPS central processor 218 may incorporate a RPS data storage 230 module and one or more sensor systems 220 which monitor the status of the various components within the RPS 100. For instance, aside from the external environment sensors 224, a UIS location sensor 222 may be in communication with the mechanical elevation solution 112 to monitor and/or control a positioning of the solution 112 relative to the UIS 300 of a landed UAV 108. Also, a MPB state monitor system 226 may be in communication with the MPB status monitor 216 so as to monitor a status of the modular power bay 700. The RPS system state sensors 228 within the sensor systems 220 may be in communication with the RPS environment control system 232.

While the RPS 100 may be self-contained, the RPS system may be in wired or wireless communication through the transmitter and receiver 106 within the RPS central processor 218 with a remotely located system through a communication network 234 for transmitting and/or receiving data as well as instructions.

Figure 2B:
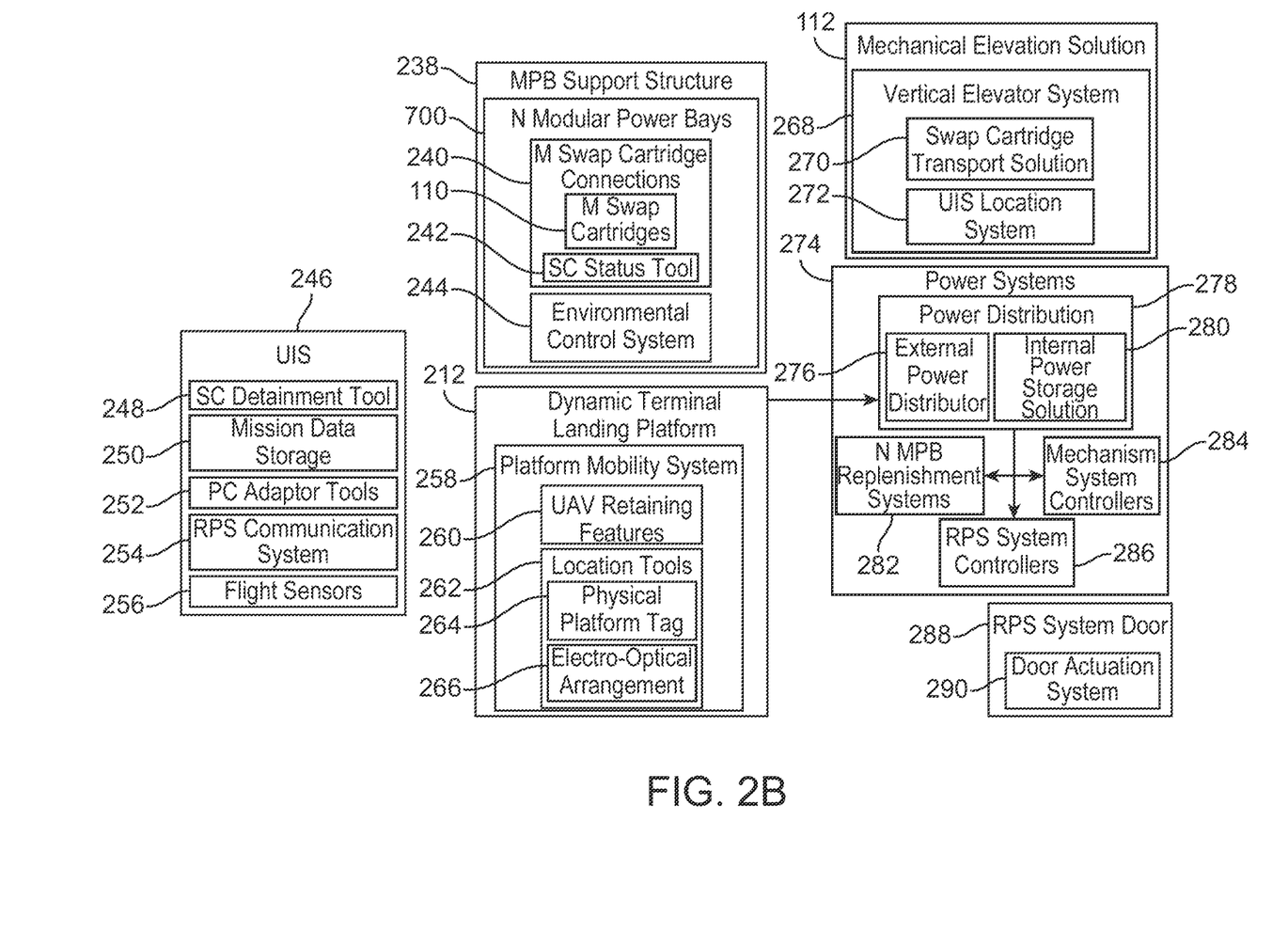

Within the RPS 100 system, schematic diagrams of some of the sub-systems are shown in FIG. 2*b*. With reference to the UIS 246 which is secured to the UAV, retains the SC 110, and interacts with the RPS 100, the UIS 246 may generally include an SC detainment tool 248 for retaining or securing the SC 110 during flight. A mission data storage medium 250, PC adaptor tools 252, RPS communication system 254, as well as flight sensors 256 may also be incorporated.

The dynamic terminal landing platform 212 may include a platform mobility system 258 which controls and monitors the retrieval of the SC 110. As part of the platform mobility system 258, a UAV retaining features 260 may be incorporated, as described herein, as well as location sensors 262 for locating the position and orientation of the UAV. This may include a physical platform tag 264 as well as electro-optical arrangement 266 for determining the position and orientation.

The power system 274 may include the power distribution 278 which in turn includes the external power distributor 276 and internal power storage solution 280 for controlling and/or monitoring the power when receiving from or delivering to an external source and/or when charging or powering the internal systems. The external power distributor 276, for instance, may be in communication with the dynamic terminal landing platform 212 for controlling and/or monitoring the charging of the UAV systems when landed. The power distribution 278 may also power the various mechanical system controllers 284, RPS system controllers 286, as well as the MPB replenishment systems 282.

The mechanical elevation solution 112 may also include a vertical elevator system 268 for lifting and/or lowering the SC 110 from or to the modular power bay 700. This may include a swap cartridge transport solution 270 as well as the UIS location system 272 for also locating the position and orientation of the UIS upon the UAV.

The MPB support structure 238 may include the modular power bays 700 which includes the swap cartridge connections 240 and environmental control system 244. The swap cartridge connections may include the one or more SC 110 as well as the SC status tool 242.

Additionally, the RPS system door 288 may also be seen which includes a door actuation system 290. The RPS system door 288 may be opened when swapping out the SC 110 from a landed UAV or closed when not in use or after a UAV has departed the RPS.

The schematic diagram of FIG. 4a, in accordance with some or all aforementioned components, illustrates one example of a method of SC 110 exchange for with an embodiment of an RPS 100. A UAV 108 may utilize an RPS 100 for the purposes of, but not limited to, SC replenishment, safe stowing, and/or data transmission, etc. A UAV 108, via some predetermined (external to the RPS 100 system) conditions, the UAV 108 may request for permission 400 to land onto an RPS 100, where the request is transmitted via the USP 1102. When approved by the RPS-CP in the RPS 100, the active UAV 108 is assigned a position in the landing queue 402. When an RPS 100 is available, said RPS 100 provides permission 404 to land to the appropriate UAV USP 1102. The USP 1102 then guides the landing UAV 108 onto an RPS 100 utilizing the DTL system 410.

After the successful landing of a UAV 108 onto the RPS 100, the RPS 100 may begin to access and download 408 mission and/or payload data from the landed UAV 108 via the USP 1102. The data may be stored within the RPS data storage or transmitted to a separate location via a wired or wireless transmission 406.

The landed UAV 108 may also establish 412 an electrical and/or mechanical link 600 with the RPS 100. The RPS 100 may now begin a search 414 for the UIS 300 which may be adapted to the landed UAV 108. Upon location of the UIS 300 of the landed UAV 108, the RPS 100 may position the UIS 300 into a nominal position 424 for removal of one or more SCs 110 from the stationary UAV 108 via the SC swapping adapter 302. After removal 422 of desired SC or SCs 110, the depleted SC or SCs 110, may be allocated 420 to an available MPB SCR 702 for replenishment or storage. The RPS 100 may return 418 an energized SC, or SCs 110, compatible to the UIS 300 of the stationary UAV 108 and then install the "fully energerized" PC into the UAV 416. Dependent on an external power source 428 supplied to a RPS 100, said depleted SC 110 is capable of being energized 430.

Once the RPS 100 has replenished the UIS 300 of the stationary UAV 108, said UAV 108 may be cleared 426 to leave the RPS 100. In consideration, before a UAV 108 is cleared to launch from an RPS 100, environmental conditions 236 may be assessed to confirm safe flight possible for the UAV 108 based on inherent flight capabilities and may involve a primary systems check and preflight check of the UAV 108.

Figure 4B:
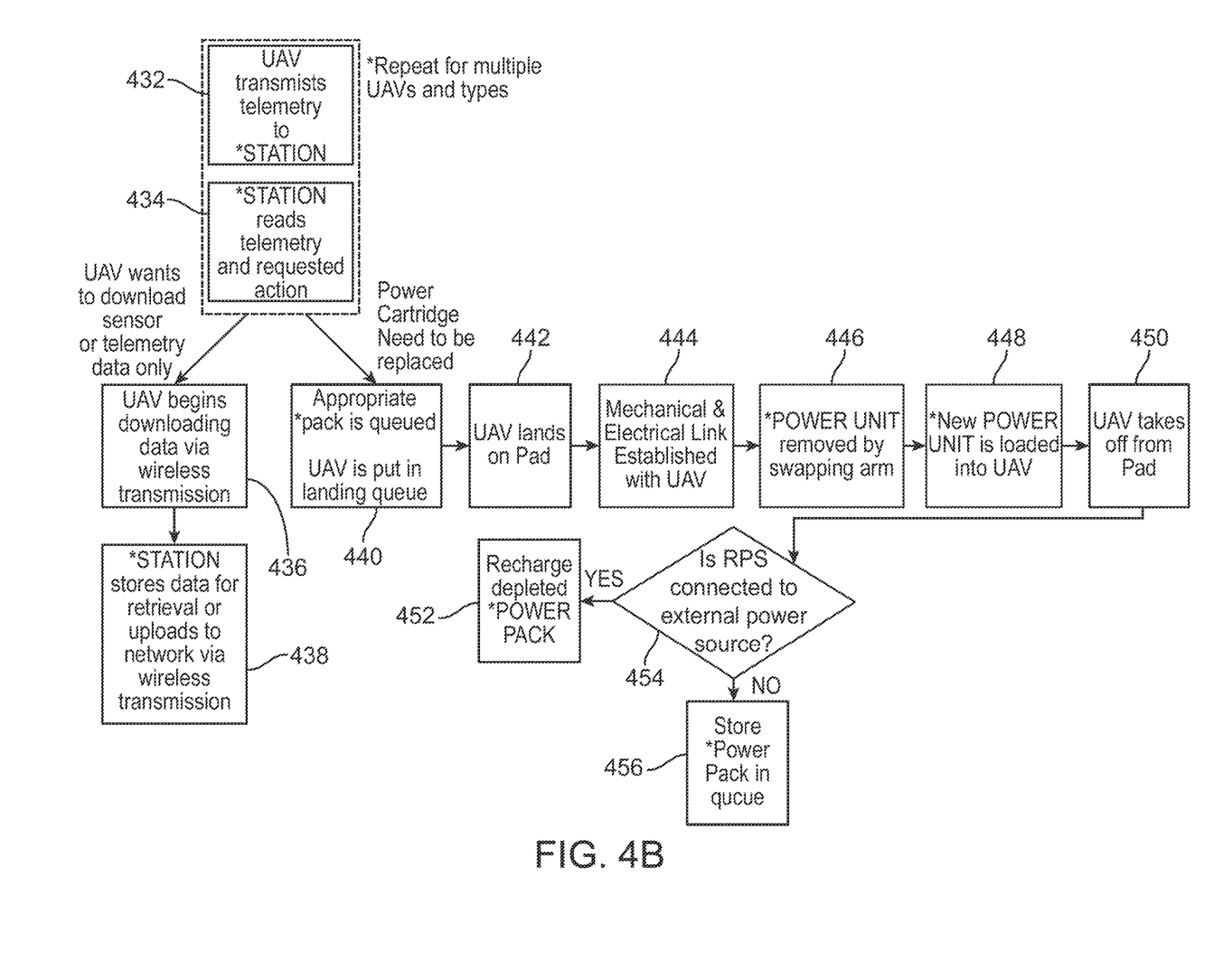

FIG. 4b illustrates another variation for a method of SC 110 exchange with an embodiment of an RPS 100. When the UAV 108 is in use, it may transmit telemetry to an RPS 100 system 432 and the RPS 100 may receive the telemetry and requested action by the UAV 434. This action may occur multiple times in any given time period during UAV flight and may also be repeated for multiple UAVs which may be in use simultaneously.

In the event that the UAV 108 wants to download sensor or telemetry data only, the UAV 108 may begin downloading the data via wireless transmission 436, as previously described, and the RPS 100 may store the data for retrieval at a later time or it may upload the data 438 to a communications network 234, as previously described.

In the event that the SC 110 needs to be replaced, the RPS 100 may determine which replacement SC from the MPB 700 is to be queued and the UAV 108 is then placed in a landing queue 440 (depending on whether other UAVs are queued for landing). Once the UAV 108 has landed 442 on the landing zone 102 of the RPS 100, the mechanical and/or electrical link may be established 444 with the UAV 108, as previously described. The SC 110 may be removed 446 from the UAV 108 and a new SC may be loaded 448 into the UAV 108. The UAV 108 may then be cleared for take-off 450 from the landing zone 102.

The RPS 100 may make a determination as to whether the RPS 100 is connected to an external power source 454 in which case the depleted SC 110 may be charged 452 accordingly. Otherwise, if the RPS 100 is not connected to an external power source, the depleted SC 110 may be stored in a queue 456 within the MPB 700 or it may be charged by an internal power source.

The applications of the disclosed invention discussed above are not limited to the embodiments described, but may include any number of other non-flight applications and uses. Modification of the above-described methods and devices for carrying out the invention, and variations of aspects of the invention that are obvious to those of skill in the arts are intended to be within the scope of this disclosure. Moreover, various combinations of aspects between examples are also contemplated and are considered to be within the scope of this disclosure as well.

What is claimed is:

1. A method of swapping a power supply in an unmanned aerial vehicle (UAV), comprising:
    transmitting one or more signals to a UAV via one or more markers or emitters when the UAV is in proximity to a landing zone located on a reconfigurable power station (RPS);
    determining an orientation of the UAV relative to the landing zone after the UAV has landed;
    removing a first swap cartridge from the UAV via a swapping adaptor which is positionable upon a vertical elevator system from within the RPS and lowering the first swap cartridge into the RPS;
    obtaining a second swap cartridge via the swapping adaptor from one or more receiving bays positioned within the RPS and lifting the second swap cartridge separately from the one or more receiving bays within the RPS via the vertical elevator system into alignment with a swap cartridge receptacle within a housing on the UAV, wherein each of the one or more receiving bays are aligned symmetrically relative to one another in a fixed position relative to the RPS;
    advancing the second swap cartridge along the swapping adaptor such that the second swap cartridge is transferred into the housing on the UAV; and
    transmitting a clearance signal for take-off to the UAV via the RPS upon completion of a preflight check of the UAV.

2. The method of claim 1 further comprising receiving a request from the UAV by the RPS prior to transmitting one or more signals to the UAV.

3. The method of claim 2 wherein receiving a request comprises transmitting the request via a universal swap cartridge processor positioned within or upon the UAV.

4. The method of claim 3 further comprising receiving mission or payload data from the UAV via the universal swap cartridge.

5. The method of claim 1 further comprising establishing a mechanical link with the UAV prior to removing a first swap cartridge.

6. The method of claim 5 further comprising establishing an electrical link with the UAV.

7. The method of claim 1 wherein determining an orientation of the UAV comprises optically determining the orientation.

8. The method of claim 1 wherein removing a first swap cartridge comprises removing a depleted swap cartridge from the UAV.

9. The method of claim 8 wherein advancing the second swap cartridge comprises installing an energized swap cartridge from the RPS and into the UAV.

10. The method of claim 1 wherein transmitting the clearance signal for take-off to the UAV via the RPS further comprises assessing an environmental condition to confirm a flight possibility based on inherent flight capabilities of the UAV.

11. A method of swapping a power supply in an unmanned aerial vehicle (UAV), comprising:
   receiving a UAV upon a landing zone located on a housing of a power station;
   removing a first cartridge from the UAV via a swapping mechanism which is positionable upon a vertical elevator system within the power station and vertically moving the first cartridge into a first receiving bay within the power station RPS;
   obtaining a second cartridge via the swapping mechanism from a second receiving bay positioned within the power station by lifting the second cartridge separately from a plurality of receiving bays within the power station via the vertical elevator system and into alignment with the UAV, wherein each of the receiving bays are aligned symmetrically relative to one another in a fixed position relative to the power station;
   advancing the second cartridge via the vertical elevator system such that the second cartridge is transferred onto the housing on the UAV; and
   clearing the UAV for take-off from the power station.

12. The method of claim 11 further comprising receiving a request from the UAV prior to receiving the UAV upon the landing zone.

13. The method of claim 12 wherein receiving a request comprises transmitting the request via a processor positioned within or upon the UAV.

14. The method of claim 13 further comprising receiving mission or payload data from the UAV via the processor.

15. The method of claim 11 further comprising establishing a mechanical link with the UAV prior to removing the first cartridge.

16. The method of claim 15 further comprising establishing an electrical link with the UAV.

17. The method of claim 11 wherein removing the first cartridge comprises removing a depleted cartridge from the UAV.

18. The method of claim 17 wherein advancing the second cartridge comprises installing an energized cartridge from the power station and into the UAV.

19. The method of claim 11 wherein providing clearance for take-off to the UAV comprises providing the clearance upon completion of a preflight check of the UAV.

20. The method of claim 19 wherein clearing the UAV further comprises assessing an environmental condition to confirm a flight possibility based on inherent flight capabilities of the UAV.

* * * * *